United States Patent
Chen et al.

(10) Patent No.: US 11,796,978 B2
(45) Date of Patent: Oct. 24, 2023

(54) METHOD FOR DETERMINING ROOT CAUSES OF EVENTS OF A SEMICONDUCTOR MANUFACTURING PROCESS AND FOR MONITORING A SEMICONDUCTOR MANUFACTURING PROCESS

(71) Applicant: ASML NETHERLANDS B.V., Veldhoven (NL)

(72) Inventors: Chang-Wei Chen, Taiwan (CN); Si-Han Zeng, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 16 days.

(21) Appl. No.: 17/292,586

(22) PCT Filed: Oct. 21, 2019

(86) PCT No.: PCT/EP2019/078570
§ 371 (c)(1),
(2) Date: May 10, 2021

(87) PCT Pub. No.: WO2020/108862
PCT Pub. Date: Jun. 4, 2020

(65) Prior Publication Data
US 2021/0397152 A1    Dec. 23, 2021

(30) Foreign Application Priority Data

Nov. 26, 2018 (EP) ..................................... 18208386
Mar. 4, 2019 (EP) ..................................... 19160513

(51) Int. Cl.
*G05B 19/042* (2006.01)

(52) U.S. Cl.
CPC ................... *G05B 19/0426* (2013.01); *G05B 2219/23291* (2013.01); *G05B 2219/2602* (2013.01)

(58) Field of Classification Search
CPC ...... G05B 19/0426; G05B 2219/23291; G05B 2219/2602; G05B 2219/32128;
(Continued)

(56) References Cited

U.S. PATENT DOCUMENTS 5,229,872 A    7/1993  Mumola
5,296,891 A    3/1994  Vogt et al.
(Continued)

FOREIGN PATENT DOCUMENTS

EP    3309617    4/2018
EP    3312672    4/2018
(Continued)

OTHER PUBLICATIONS

International Search Report and Written Opinion issued in corresponding PCT Patent application No. PCT/EP2019/078570, dated Jan. 23, 2020.
(Continued)

*Primary Examiner* — Thomas C Lee
*Assistant Examiner* — Tyler Dean Hedrick
(74) *Attorney, Agent, or Firm* — Pillsbury Winthrop Shaw Pittman, LLP

(57) ABSTRACT

A user interface for designing, configuring and/or editing a control flow representing a control strategy associated with a semiconductor manufacturing process, the user interface including: a library of control elements having at least a control element representing a task of simulation and each control element being selectable by a user; a control flow editor configured to organize the control elements into a control flow representing the control strategy; and a com-
(Continued)

(a)

(b)

(c)

(d)

munication interface for communicating the control flow to a calculation engine configured to evaluate the control flow.

20 Claims, 5 Drawing Sheets

(58) Field of Classification Search
CPC .......... G05B 2219/32162; G05B 2219/36025; G05B 2219/45031; G05B 19/41885; Y02P 90/02
See application file for complete search history.

(56) References Cited

U.S. PATENT DOCUMENTS

| | | | |
|---|---|---|---|
| 5,523,193 A | 6/1996 | Nelson | |
| 5,576,946 A | 11/1996 | Bender et al. | |
| 6,952,253 B2 | 10/2005 | Lof et al. | |
| 2003/0093174 A1* | 5/2003 | Nikulin | G05B 19/41885 700/121 |
| 2004/0207824 A1 | 10/2004 | Lof et al. | |
| 2005/0010319 A1* | 1/2005 | Patel | G05B 13/048 700/121 |
| 2005/0047645 A1 | 3/2005 | Funk et al. | |
| 2006/0016561 A1 | 1/2006 | Choi et al. | |
| 2006/0058900 A1* | 3/2006 | Johanson | G05B 15/02 700/83 |
| 2007/0085991 A1 | 4/2007 | Liegl et al. | |
| 2008/0163096 A1* | 7/2008 | Pannese | G05B 19/4069 715/772 |
| 2010/0131892 A1* | 5/2010 | Kang | G06F 3/0482 715/810 |
| 2010/0214550 A1 | 8/2010 | Hulsebos et al. | |
| 2012/0008127 A1 | 1/2012 | Tel et al. | |
| 2015/0066592 A1 | 3/2015 | Ehm et al. | |
| 2016/0140024 A1* | 5/2016 | Wang | G05B 19/41835 717/125 |
| 2017/0032058 A1* | 2/2017 | Arbel | G06F 30/33 |
| 2017/0091462 A1 | 3/2017 | Kurauchi et al. | |
| 2017/0236067 A1 | 8/2017 | Tjiong | |
| 2018/0314168 A1 | 11/2018 | Van Haren et al. | |
| 2018/0356807 A1* | 12/2018 | Honda | G05B 19/41885 |
| 2019/0041830 A1* | 2/2019 | Yarvis | G05B 19/042 |
| 2019/0086810 A1 | 3/2019 | Tel et al. | |

FOREIGN PATENT DOCUMENTS

| | | |
|---|---|---|
| EP | 3312693 | 4/2018 |
| JP | 2004334464 | 11/2004 |
| JP | 5716108 | 5/2015 |
| JP | 2017068825 | 4/2017 |
| JP | 2017142800 | 8/2017 |
| TW | 200402616 | 2/2004 |
| TW | 200424816 | 11/2004 |
| TW | 200609782 | 3/2006 |
| WO | 199/49504 | 9/1999 |
| WO | 2011081645 | 7/2011 |
| WO | 2013092106 | 6/2013 |
| WO | 2015101458 | 7/2015 |
| WO | 2015110191 | 7/2015 |
| WO | 2017140532 | 8/2017 |
| WO | 2018072962 | 4/2018 |
| WO | 2018077651 | 5/2018 |
| WO | 2018202361 | 11/2018 |

OTHER PUBLICATIONS

Taiwanese Office Action issued in corresponding Taiwanese Patent application No. 108140983, dated Dec. 2, 2020.
Korean Office Action issued in corresponding Korean Patent Application No. 10-2021-7015873, dated Sep. 14, 2022.

* cited by examiner

METHOD FOR DETERMINING ROOT CAUSES OF EVENTS OF A SEMICONDUCTOR MANUFACTURING PROCESS AND FOR MONITORING A SEMICONDUCTOR MANUFACTURING PROCESS

CROSS-REFERENCE TO RELATED APPLICATIONS

This application is the U.S. national phase entry of PCT Patent Application No. PCT/EP2019/078570 which was filed on Oct. 21, 2019, which claims the benefit of priority of European Patent Application No. 18208386.5 which was filed on Nov. 26, 2018 and of European Patent Application No. 19160513.8 which was filed on Mar. 4, 2019, each of which is incorporated herein in its entirety by reference.

FIELD

The present invention relates to semiconductor manufacturing processes, in particular methods to root causes which affect yield on substrates subject to the process.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD = k_1 \times \lambda / NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low $k_1$.

To optimize such control loops and/or other elements of the semiconductor manufacturing process, an analysis tool may be provided. Such an analysis tool typically enables one or more pre-defined control strategies to be simulated and evaluated, so as to optimize the manufacturing process. However, such analysis tools lack flexibility.

SUMMARY

It is an object of the inventors to improve on such an analysis tool.

In a first aspect of the invention there is provided a user interface for designing, configuring and/or editing a control flow representing a control strategy associated with a semiconductor manufacturing process, the user interface comprising: a library of control elements, each control element being selectable by a user; a control flow editor configured to organize said control elements into a control flow representing the control strategy; and a communication interface for communicating the control flow to a calculation engine configured to evaluate the control flow.

In a second aspect of the invention, there is provided a control strategy evaluation tool comprising: a user interface of the first aspect and a calculation engine configured to evaluate the control flow received via the communication interface.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. More information on such mirror arrays is given in U.S. Pat. Nos. 5,296,891 and 5,523,193, which are incorporated herein by reference.

a programmable LCD array. An example of such a construction is given in U.S. Pat. No. 5,229,872, which is incorporated herein by reference.

Figure 1:
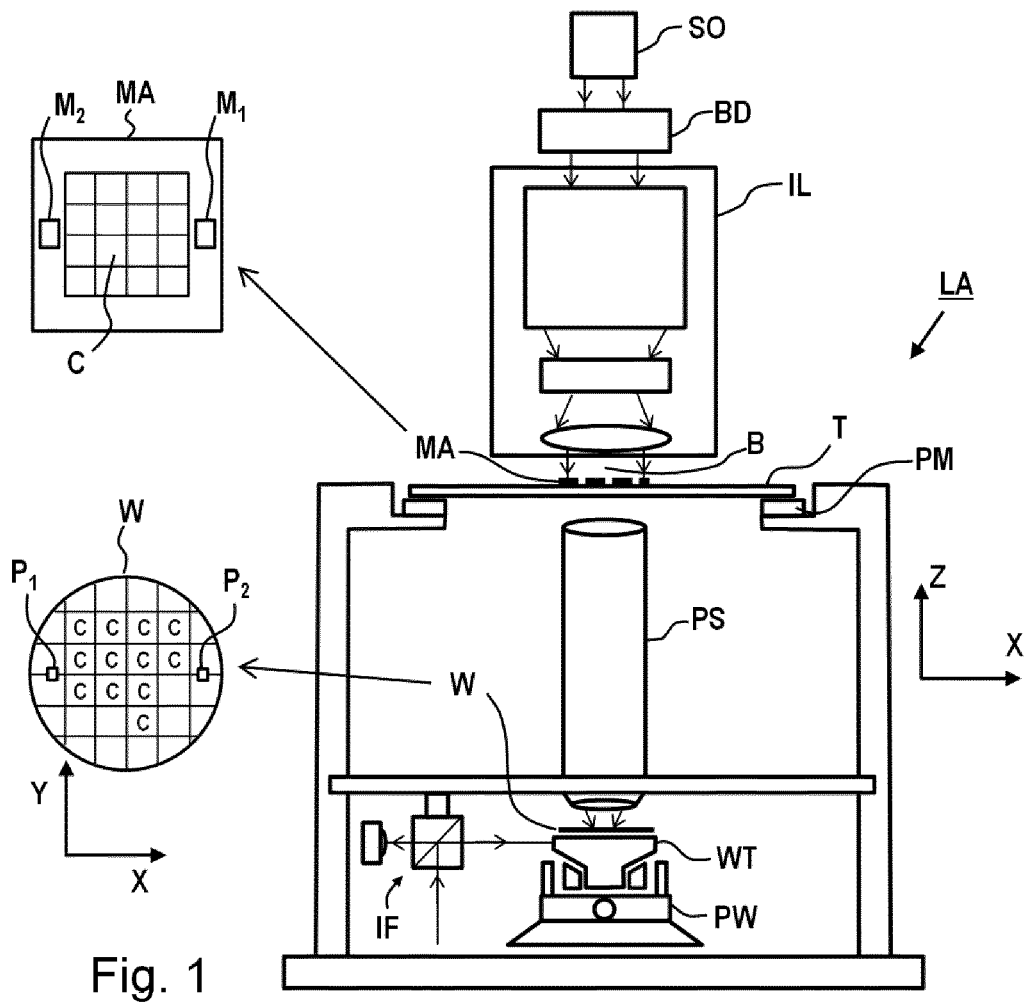
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a support structure (e.g., a mask table) MT constructed to support a patterning device (e.g., a mask) MA and connected to a first positioner PM configured to accurately position the patterning device MA in accordance with certain parameters, a substrate table (e.g., a wafer table) WT constructed to hold a substrate (e.g., a resist coated wafer—wafer and substrate are synonymous and will be used interchangeably throughout the disclosure) W and connected to a second positioner PW configured to accurately position the substrate in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illuminator IL receives a radiation beam from a radiation source SO, e.g. via a beam delivery system BD. The illumination system IL may include various types of optical components, such as refractive, reflective, magnetic, electromagnetic, electrostatic, or other types of optical components, or any combination thereof, for directing, shaping, or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system" PS.

The lithographic apparatus may be of a type wherein at least a portion of the substrate may be covered by a liquid having a relatively high refractive index, e.g., water, so as to fill a space between the projection system and the substrate—which is also referred to as immersion lithography. More information on immersion techniques is given in U.S. Pat. No. 6,952,253 and in PCT publication No. WO99-49504, which are incorporated herein by reference.

The lithographic apparatus LA may also be of a type having two (dual stage) or more substrate tables WT and, for example, two or more support structure MT (not shown). In such "multiple stage" machines the additional tables/structures may be used in parallel, or preparatory steps may be carried out on one or more tables while one or more other tables are being used for exposing the design layout of the patterning device MA onto the substrate W.

In operation, the radiation beam B is incident on the patterning device (e.g., mask MA), which is held on the support structure (e.g., mask table MT), and is patterned by the patterning device MA. Having traversed the mask MA, the radiation beam B passes through the projection system PS, which focuses the beam onto a target portion C of the substrate W. With the aid of the second positioner PW and position sensor IF (e.g., an interferometric device, linear encoder, 2-D encoder or capacitive sensor), the substrate table WT can be moved accurately, e.g., so as to position different target portions C in the path of the radiation beam B. Similarly, the first positioner PM and possibly another position sensor (which is not explicitly depicted in FIG. 1) may be used to accurately position the mask MA with respect to the path of the radiation beam B. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks).

Figure 2:
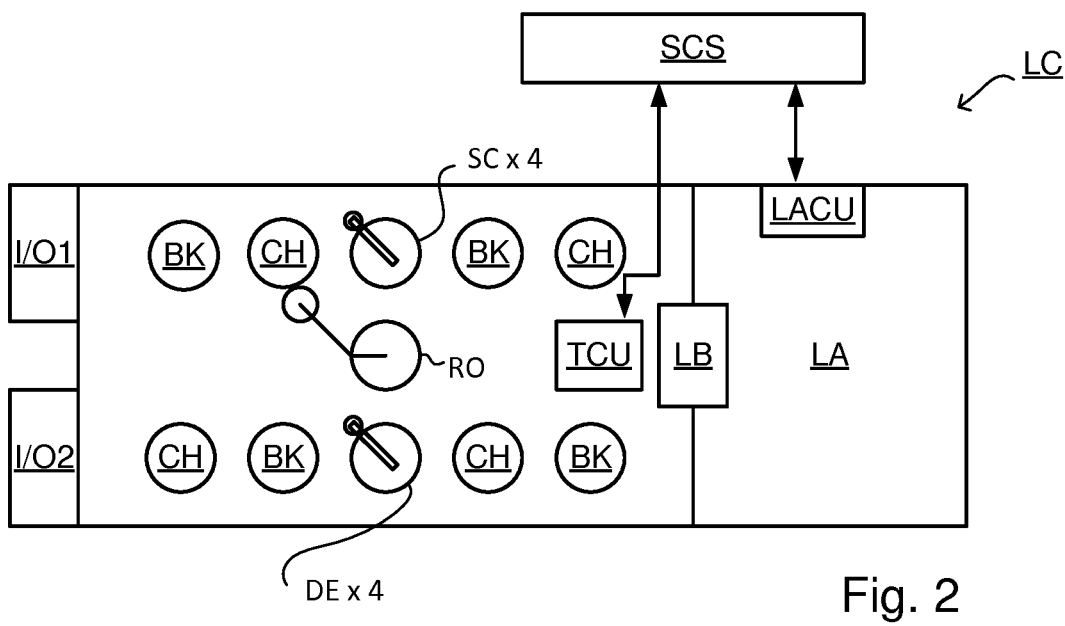
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
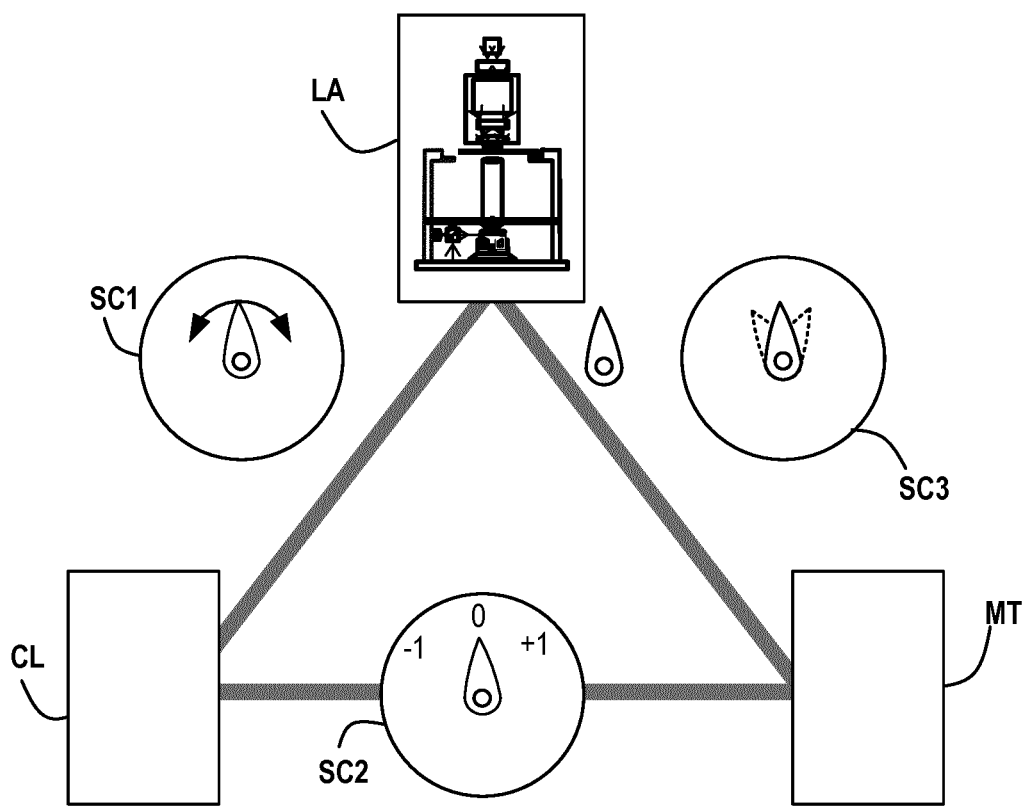
FIG. 3 depicts a schematic representation of holistic lithography, representing cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double white arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT), so as to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

The lithographic apparatus LA is configured to accurately reproduce the pattern onto the substrate. The positions and dimensions of the applied features need to be within certain tolerances. Position errors may occur due to an overlay error (often referred to as "overlay"). The overlay is the error in placing a first feature during a first exposure relative to a second feature during a second exposure. The lithographic apparatus minimizes the overlay errors by aligning each wafer accurately to a reference prior to patterning. This is done by measuring positions of alignment marks on the substrate using an alignment sensor. More information on the alignment procedure can be found in U.S. Patent Application Publication No. US20100214550, which is incorporated herein by reference. Pattern dimensioning (e.g., CD) errors may, for example, occur when the substrate is not positioned correctly with respect to a focal plane of the lithographic apparatus. These focal position errors may be associated with un-flatness of a substrate surface. The lithographic apparatus minimizes these focal positon errors by measuring the substrate surface topography prior to patterning using a level sensor. Substrate height corrections are applied during subsequent patterning to assure correct imaging (focusing) of the patterning device onto the substrate. More information on the level sensor system can be found in U.S. Patent Application Publication No. US20070085991, which is incorporated herein by reference.

Besides the lithographic apparatus LA and the metrology apparatus MT other processing apparatus may be used during IC production as well. An etching station (not shown) processes the substrates after exposure of the pattern into the resist. The etch station transfers the pattern from the resist into one or more layers underlying the resist layer. Typically etching is based on application of a plasma medium. Local etching characteristics may, for example, be controlled using temperature control of the substrate or directing the plasma medium using a voltage controlled ring. More information on etching control can be found in international Patent Application Publication No. WO2011081645 and U.S. Patent Application Publication No. US 20060016561 which are incorporated herein by reference.

During the manufacturing of the ICs, it is of great importance that the process conditions for processing substrates using processing apparatus, such as the lithographic apparatus or etching station, remain stable such that properties of the features remain within certain control limits. Stability of the process is of particular importance for features of the functional parts of the IC, i.e., the product features. To guarantee stable processing, process control capabilities need to be in place. Process control involves monitoring of processing data and implementation of means for process correction, e.g. control the processing apparatus based on characteristics of the processing data. Process control may be based on periodic measurement by the metrology apparatus MT, often referred to as "Advanced Process Control" (further also referenced to as APC). More information on APC can be found in U.S. Patent Application Publication No. US20120008127, which is incorporated herein by reference. A typical APC implementation involves periodic measurements on metrology features on the substrates to monitor and correct drifts associated with one or more processing apparatus. The metrology features reflect the response to process variations of the product features. The sensitivity of the metrology features to process variations may be different compared to the sensitivity of the product features. In that case, a so-called "Metrology To Device" offset (further also referenced to as MTD) may be determined. To mimic the behavior of product features, the metrology targets may incorporate segmented features, assist features or features with a particular geometry and/or dimension. A carefully designed metrology target should respond in a similar fashion to process variations as the product features. More information on metrology target design can be found in international Patent Application Publication No. WO 2015101458 which is incorporated herein by reference.

The distribution of locations across the substrate and/or patterning device where metrology targets are present and/or measured is often referred to as a "sampling scheme". Typically the sampling scheme is selected based on an expected fingerprint of the relevant process parameter(s); areas on the substrate where a process parameter is expected to fluctuate are typically sampled more densely than areas where the process parameter is expected to be relatively stable. However, there is a practical limit to the number of metrology measurements which can be performed, based on the allowable impact of the metrology measurements on the throughput of the lithographic process. A carefully selected sampling scheme is important to accurately control the lithographic process without affecting throughput (or at least affecting it too much) and/or assigning a too large area on the reticle or substrate to metrology features. Technology related to optimal positioning and/or measuring metrology targets is often referred to as "scheme optimization". More information on scheme optimization can be found in international Patent Application Publication No. WO 2015110191 and the European patent application, application number EP16193903.8 which are incorporated herein by reference.

The term fingerprint may refer to a main (systematic) contributor ("latent factor") of a measured signal, and in particular a contributor connected to the performance impact on-wafer or to previous processing steps. Such a fingerprint can refer to substrate (grid) patterns (e.g. from alignment, leveling, overlay, focus, CD), field patterns (e.g., from intrafield alignment, leveling, overlay, focus, CD), substrate zone patterns (e.g., outermost radius of wafer measurements) or even patterns in scanner measurements related to wafer exposure (e.g., heating signature through-lot from reticle alignment measurements, temperature/pressure/servo profiles, etc.). Fingerprints may be comprised within a fingerprint collection, and may be encoded homogenously or heterogeneously therein.

In addition to metrology measurement data, context data may be used for process control. Context data may comprise data relating to one or more of: the selected processing tools (out of the pool of processing apparatus), specific characteristics of the processing apparatus, the settings of the processing apparatus, the design of the circuit pattern and measurement data relating to processing conditions (for example wafer geometry). Examples of using context data for process control purposes may be found in European patent application, application number EP16156361.4, and international patent application, application number PCT/EP2016/072363 which are incorporated herein by reference. Context data may be used to control or predict processing in a feed-forward manner, where the context data relates to process steps performed before the currently controlled process step. Often context data is statistically correlated to product feature properties. This enables context driven control of processing apparatus in view of achieving optimal product feature properties. Context data and metrology data may also be combined e.g. to enrich sparse metrology data to an extent that more detailed (dense) data becomes available, which is more useful for control and/or diagnostic purposes. More information on combining context data and metrology data can be found in U.S. Patent provisional application No. 62/382,764 which is incorporated herein by reference.

As said, monitoring the process is based on acquisition of data related to the process. The required data sampling rate (per lot or per substrate) and sampling density depend on the required level of accuracy of pattern reproduction. For low-k1 lithographic processes, even small substrate-to-substrate process variations may be significant. The context data and/or metrology data should then be sufficient to enable process control on a per-substrate basis. Additionally when a process variation gives rise to variations of a characteristic across the substrate, the density of the context and/or metrology data should be sufficiently distributed across the substrate. However the time available for metrology (measurements) is limited in view of the required throughput of the process. As a result of this limitation, the metrology tool may measure only on selected substrates and/or selected locations across the substrate. The strategies to determine which substrates need to be measured are further described in the European patent applications EP16195047.2 and EP16195049.8, which are incorporated herein by reference.

In practice, it is often necessary to derive a denser map of values from a sparse set of measurement values relating to a process parameter (across a substrate or plurality of substrates). Typically such a dense map of measurement values may be derived from the sparse measurement data in conjunction with a model associated with an expected fingerprint of the process parameter. More information on modeling measurement data can be found in international Patent Application Publication No. WO 2013092106 which is incorporated herein by reference. As a semiconductor manufacturing process involves multiple processing apparatuses (lithographic apparatus, etching stations, etc.), it may be beneficial to optimize the process as a whole; e.g., take specific correction capabilities associated with individual processing apparatus into account. This leads to the perspective that control of a first processing apparatus may be (partly) based on known control properties of a second processing apparatus. This strategy is commonly referred to as co-optimization. Examples of such a strategy include joint optimization of a lithographic apparatus and a density profile of a patterning device, and joint optimization of a lithographic apparatus and an etching station. More information on co-optimization may be found in international Patent application, application No. PCT/EP2016/072852 and US. Patent provisional application No. 62/298,882 which are incorporated herein by reference.

In some process control situations, the control objective may be, for example, "number of dies in spec". This describes a yield driven process control parameter which aims to obtain a maximum number of functional products per batch of processed substrates. Typically a product is associated with a die on a substrate and, as such, yield based process control is referred to as based on a "dies-in-spec" criterion. This aims to maximize the number of dies within specification, rather than applying an averaged optimization across the substrate (e.g., a least-squares optimization based on a least squares minimization of focus difference from best focus across the substrate). As such, a "dies-in-spec" optimization may use prior knowledge of the product (the die layout) when optimizing a process parameter. A least squares optimization typically treats each location equally, without taking into account the die layout. As such, a least squares optimization may prefer a correction which "only" has four locations out-of-specification, but each in a different die, over a correction which has seven locations out-of-specification, but only affecting two dies (e.g., four defects in one die, three in another). However, as a single defect will tend to render a die defective, maximizing the number of defect-free dies (i.e., dies-in-spec) is ultimately more important than simply minimizing the number of defects per substrate. A dies-in-spec optimization may comprise a maximum absolute (max abs) per die optimization. Such a max abs optimization may minimize the maximum deviation of the performance parameter from a control target. A differentiable approximation for the max abs function could be used instead, so that the cost function is easier to solve. For this to be effective, detail such as the wafer map should be used in the optimization. To obtain a good yield-based process control, a sampling scheme for metrology measurements may benefit from measurements performed at, on or near locations which are expected to be most critical for yield and/or may be statistically most relevant to determine whether yield is affected. In addition to measuring properties of product features, the occurrence of defects may be measured to further assist in optimizing the process for optimal yield (reference defect inspection). More information on yield based control may be found in PCT patent application WO2018077651, which is incorporated herein by reference.

In addition to performing metrology measurements on pre-defined locations and substrates, there is a trend to dynamically allocate the locations and substrates which need to be selected for measurement. An example of dynamically selecting substrates for measurements is described in PCT patent application WO2018072962 which is incorporated herein by reference. More information on dynamic selection of measurement locations (e.g., sampling schemes) may be found in PCT patent application WO2017140532 which is incorporated herein by reference.

To provide better yield correction capability to a semiconductor manufacturing process, it is proposed to predict the yield of a substrate based on data which is already available during the processing. During processing of the substrate multiple layers are deposited, patterned and etched. It is vital that patterns (features) provided on the substrate have well-defined properties in order to yield a functional device. For example features should be imaged at the correct focus position, have the correct critical dimensions (CD), correct edge placement (i.e., minimal edge placement error EPE) and have good overlay (i.e., each layer being aligned accurately to features associated with underlying layers). As stated previously, the lithographic apparatus (e.g., alignment system, leveling system) and the metrology apparatus (e.g., scatterometer or e-beam tool) play an important role in measuring these parameters, in some cases for all substrates within a lot.

To implement inter alia many of the above described computational lithography and process control techniques described above, a semiconductor manufacturing control process, a control process analysis tool is employed. Such an analysis tool typically enables a user to select one or more process flows for simulation and/or optimization of a control process. The process flows may each describe a number of steps of a particular control strategy, such as a particular feedback or feedforward strategy. Such a simulation is used in control flow development, for example, to enable decisions to be made for optimizing the manufacturing process, minimize yield loss etc., based on the output of a simulation of the control strategy for a particular process case.

An analysis tool, such as described, comprises only pre-defined control strategies. Each of these pre-defined control strategies comprise a fixed flow of control elements (for example, simulation elements, estimation elements, optimization elements, etc.) which have pre-defined (but editable) settings. A user selects one or more of these pre-defined control strategies and simulates/optimizes a control process according to the selected control strategies. Purely for example, a pre-defined control strategy may comprise a flow simulating a feed-forward control strategy using computational metrology, or a flow simulating a run-to-run overlay feedback strategy.

There are a number of drawbacks with such analysis tools and, consequently, present methods for control flow development. These include a lack of flexibility and opportunity for customization. Selecting from predefined (hardcoded) control strategies provides little opportunity to accommodate new requests and/or user requirements. When a new control flow (use case) is encountered, even when only a minor flow change, the analysis tool essentially needs to be redesigned (e.g., recoded or recompiled) to accommodate the change. Any control proposal for which a control flow is unavailable cannot be evaluated without significant coding effort. This results in a significant development time for control flow development to incorporate such recoding and/or developing a new tool. Any future extension is difficult to implement since each control flow is hardcoded. As a result, to properly implement each new control flow or flow change, a software engineer is required to code the control flow, and therefore will need to know the functional flow, which is not necessarily a core competency of a software engineer.

In addition, existing analysis or control flow simulation tools do not support a graphical visualization of the control flows as the predefined control strategies are typically represented as single entities. Existing tools normally require significant configuration which is not friendly for inexperienced user.

A development tool is therefore proposed, which provides the functionality to design and/or configure control process flows in a modular fashion. Such a development tool may comprise a user interface for designing, configuring and/or editing a control flow representing a control strategy. Control elements comprising elementary actions are presented in a flow design interface; each control element being freely configurable using editable element setting elements. The elementary actions may comprise one or more of simulation, correction, de-correction, optimization, sampling and visualization. This is a non-exhaustive list, and the skilled person will recognize that many other elementary actions may be included.

The proposed control flow design interface enables easy and intuitive building of control strategies for any use case of interest, instead limiting a user to a hardcoded interface of pre-defined control strategies. Such an approach enables a user to build super jobs, provides a good visualization of control flow, and is easy and flexible to use.

It is proposed that the control flows designed using the flow design interface can then be evaluated in the same manner as the pre-defined control templates were in the present analysis tool. In an additional embodiment, such pre-defined control templates can still be provided and used in the same manner. This presents the opportunity for inexperienced users to continue to use the tool in the manner the present analysis tool is presently used, and/or can provide a short cut for common control strategies. For example, inexperienced users may use pre-defined control templates while experienced users may freely define/edit new control strategies and simulate their impact on the process performance (yield, overlay, etc.).

However, users can be afforded the opportunity to change each of the flows (whether user defined and/or pre-defined). For example, different elements can be added/removed, changed in order, and/or their relationships otherwise changed. Purely by way of example, such functionality may enable the relatively simple implementation of a self-correction overlay control flow strategy instead of a run-to-run feedback overlay control flow simulation. To implement such a change, only a relatively minor change to the control flow is necessary. However, using the present analysis tool, an entire new flow would need to be coded.

Figure 4:
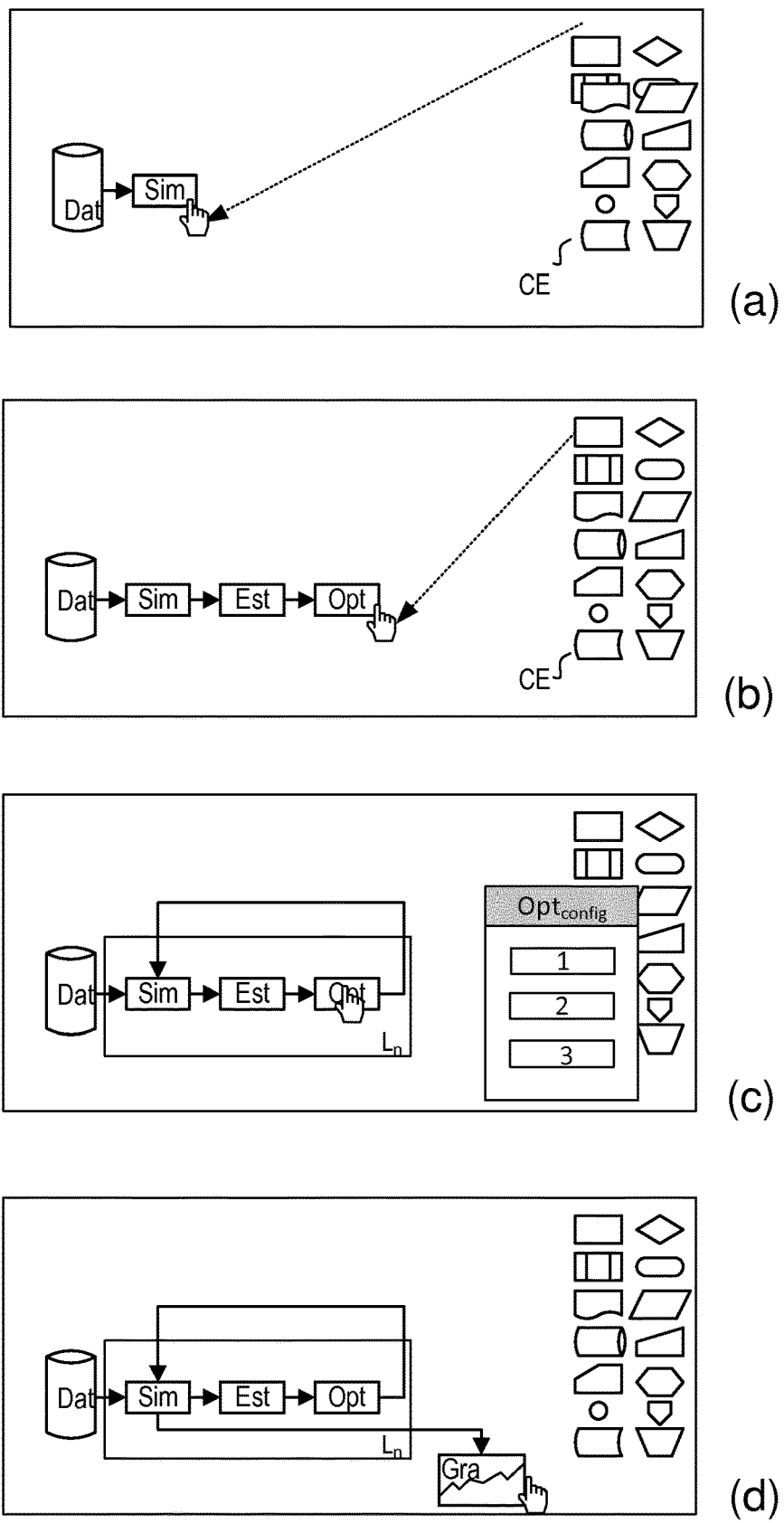
FIGS. 4(a)-(d) schematically illustrate four successive screenshots of a control flow design interface according to an embodiment of the invention

FIG. 4 illustrates how a flow design interface might operate, according to an example. A library of control elements (function blocks) and data elements (data blocks representing a data source or storage) may be provided. Control elements CE and data elements can be dragged (represented by the cursor and dotted arrow), or otherwise selected and moved to a main design area. In this (highly simplified) example, the control flow comprises a data element Dat, a simulation task element Sim, an Estimation task element Est and a Optimization task element Opt. The flow relationships (represented by the arrows) are also fully configurable. The example here shows that a lot-to-lot (lot $L_n$, shown) feedback flow (FIG. 4(c)). Each control element (and data element) may be configurable. For example (as represented by FIG. 4(c)), a control element, here the Optimization task element Opt, can be selected and a particular optimization option selected. This is implemented here, purely by example, via a pop-up window $Opt_{config}$ which presents a number of options (1, 2, 3), each representing a different optimization option. FIG. 4(d) shows how one or more visualization elements (here a graphical element Gra) can also be incorporated into each flow. Of course, such visualization elements may also include any suitable visualization medium; e.g., tables, wafer maps etc.

As such, the user may freely select control elements, configure the control elements and organize the control elements using said flow diagram approach. The flow basically being defined as a collection of control elements with their associated configurations (settings) and the relations between said control elements. The relationship between the control elements demonstrates the order in which the control elements are executed and/or how information is shared between the control elements.

The control element may represent a modelling action applied to process data, for example a model fitting overlay data to a higher order function. The user may configure the control element in this case by selecting the specific function (e.g. a polynomial, exponential or a spline function). In addition the modelling action may be the combination of various data sources to reconstruct (virtual or hybrid) metrology data.

The control element may represent a simulation action; for example simulation of process performance in case the (intermediate) control strategy is applied to available process data. In addition the simulation action may be associated with de-correction and/or correction of data to remove or take into account certain known control actions (for example corrective actions to the process).

The control element may represent a control action or an action leading to generation of a control recipe. Examples are: job creation, per field control (Control Per Exposure=CPE), per wafer dedicated control action definitions (for example in the context of a Wafer Level Control strategy=WLC).

The control element may represent a data processing action, such as filtering of sensor data, extraction of data from files created during execution of the control strategy.

The control element may represent a control option (for example a certain SW functionality that may be purchased to improve the effectiveness of process control).

The control element may represent a data visualization and/or communication action, for example the calculation and communication of a KPI of the semiconductor manufacturing process to the user and/or another control element.

In an embodiment, the control flow simulation tool or control strategy evaluation tool can be provided with an advanced "intelligent" advisor module or program. Such an advisor module may provide advice based on, for example, input data and/or any requirements. The advice may comprise recommendation as to which control elements and/or settings thereof are most suitable, advice on a specific control strategy, recommendation against, or even prevention of selection of an inappropriate control element, setting or strategy. Other advice might include, advice on what data is available for control setup and/or simulation, or advice on anything else relevant to the process being simulated/evaluated. The advisor module may be implemented, in an embodiment, to provide such advice automatically.

In an embodiment, the control flow simulation tool or control strategy evaluation tool can be provided with an artificial data generator for generating artificial data based on a user input. Such artificial data can then be used as data for a simulation by the simulation tool. The artificial data may comprise, for example, artificial metrology data (e.g., overlay data, focus data, CD data etc.) extrapolated or obtained from metrology data for which the effect of a one or more variations on a control strategy, and/or another characteristic of the semiconductor manufacturing process, used to obtain said metrology data is estimated. Alternatively or in addition, artificial data may comprise data that has been anonymized from inputted sensitive user data.

As such, disclosed is a control flow simulation tool comprising a control flow design interface, which enables a user to build their own control flow and/or simulation flow in simple manner, while still (optionally) enabling existing control templates to be selected in the presently used manner. As such, users or control flow inventors can build their own control flows and verify results quickly (without software engineer input). This enables new model, product and/or platform offerings to be implemented quickly and simply by providing new control elements or control templates which can be simply integrated into control flows using the control flow interface. For example, a new computational metrology element may be added to the flow design interface to reflect addition of a new computational metrology functionality/product offering, such that this new functionality can be easily added to a flow and its effects simulated; or else a new alignment element added to reflect a change in alignment strategy and/or new alignment offering.

A purely exemplary embodiment for evaluating different process control strategies is described below, in combination with FIGS. 4 and 5. Regardless of the actual evaluation method, the evaluation of different process control strategies may be based on the following (each of which may be represented by a control element or data element as described above:

Process data: this may include historic data and/or design data which characterizes a semiconductor manufacturing process (typically for applying a series of layers to a substrate such as a wafer). Examples of process data may comprise one or more of:
  layout data (e.g., design data or reticle data) describing the layout of a particular layer. This may include layout within the die (e.g., the positions and dimensions of different functional areas within the die.
  process specification metrics such as process windows which define minimum quality standards such as maximum/minimum allowable values (specification limits) for any parameter (e.g., focus/dose/overlay/edge placement/yield) relevant to the process; process windows may be defined per field, per die, per substrate region and/or per functional area as appropriate. As such, critical structures or functional areas within a die may a more stringent process window associated with them than other structures. Process specification metrics may also include target settings (e.g., best focus settings) for any parameter. Again, these may be set per any of the regions/functional areas as described.
Process context such as: which of the available lithographic apparatuses, etch apparatuses, deposition apparatuses and chambers of mentioned apparatuses were used and/or any settings of these apparatuses, control option settings, sensor readings, product definitions.
Candidate process control strategies to be evaluated and any associated parameter settings required for their implementation; these can be input or determined from the process data.
Quality metric prediction data. This may comprise, for example, knowledge of characteristics of the candidate control strategies and/or any other control strategies (e.g., a strategy of reference) suitable for predicting quality metric data, such as how the control strategies will affect performance when applied to the process characterized by said process data. This could be based on:
  historic quality metric data relating to the process (e.g., based on metrology or previous yield determinations) and/or
  modelled/simulated quality metric data relating to the process.
Associated cost metric data for each candidate control strategy and/or any other control strategies (e.g., a strategy of reference): Examples of cost metrics include:
  Required metrology effort. This may comprise a measure of how densely and/or how often measurements should be performed to enable a certain control strategy; e.g., the sampling scheme used. A required metrology type may also be defined. The required metrology type may refer to a measurement technique or a measured parameter. The parameters may include one or more of: overlay metrology, focus metrology, CD (critical dimension)/SWA (side wall angle) metrology. The types of metrology may include:
    scatterometry based metrology e.g.:
      dark field diffraction based overlay/focus techniques (asymmetry techniques),
      reconstruction based techniques (e.g., from pupil images),
      scanning electron microscopy,
      inline metrology vs. offline metrology (e.g., requirement for inline metrology may be attributed a higher cost)
    lithographic apparatus (scanner) metrology:
      alignment metrology and/or
      leveling metrology
  Other overheads required to implement each candidate control strategy; e.g., required hardware and software and any associated costs (e.g., software licensing costs, hardware costs) associated therewith.

The candidate process control strategies may relate to the settings of and/or correction for any parameter relating to the manufacturing process. These may include (variable) parameters of any apparatus involved (directly or indirectly) in the manufacturing process, such as lithographic apparatus settings (e.g., focus settings, dose settings, stage positioning setpoints); etching apparatus settings, deposition apparatus settings, track apparatus settings, reticle manufacture and/or reticle lithography settings etc. The candidate process control strategies may also relate to a characteristic of a control interface.

The candidate process control strategies may relate to the model used; e.g., types of modeling strategies, e.g., the order (model degree) of any modeling strategy (e.g. first order/higher order), whether the modeling is per-lot, intra-lot, inter-field, intra-field, inter-die, intra-die and any other relevant model details for simulating any of the manufacturing processes (e.g., for determining corrections).

The proposed process determines a preferred control strategy from a selection of candidate control strategies, such that the preferred control strategy delivers acceptable performance (e.g., in terms of yield or other quality metric) and requires acceptable metrology effort. Other overheads may be taken into account, in addition to metrology effort: for example the required availability of software functionality (licensing costs) or hardware availability may also be evaluated in the preferred control strategy determination. The preferred control strategy may take into account whether quality or metrology time is prioritized, provided minimum standards for both are met.

Therefore, a method for determining a preferred control strategy is disclosed. In an embodiment, the method comprises: obtaining process data associated with performance and/or design data of a semiconductor manufacturing process; determining an expected performance and cost for a plurality of candidate control strategies configured to control the semiconductor manufacturing process based on: a) the process data, b) characteristics of individual control mechanisms comprised within each control strategy, and c) the cost metrics: e.g., a required metrology effort and/or availability of software components associated with each candidate control strategy.

Also disclosed, in an embodiment, is a software product which comprises an interface which interfaces to process data, the process data being associated with performance and/or design information of a semiconductor manufacturing process; and a calculation engine configured to apply a plurality of candidate control strategies to the process data so as to evaluate their (expected) performance and cost. From this evaluation a preferred/selected control strategy may be selected from the plurality of candidate control strategies.

In an embodiment, the cost associated for each candidate control strategy may be calculated based on a cost function having one or both of the following arguments: metrology effort needed to facilitate a control strategy, and other overheads such as cost of software and/or hardware components needed to enable a control strategy. Metrology effort may be measured in metrology time as this affects throughput. This will depend on the number of measurements made: i.e., measurement density and/or measurement frequency. With regard to other overheads, a control strategy may require a particular simulation approach, which in turn may require software having an associated cost (such as software licensing cost) or dedicated processor hardware. Similarly a control strategy may require additional metrology effort which not only adds metrology time, but requires an additional apparatus (e.g., a scanning electron microscope apparatus) with associated additional cost. These additional costs can also be factored into the appropriate cost function.

An interface (e.g., graphical or textual user interface) may be provided for communicating the preferred control strategy to the user. The interface may convey evaluation information relating to the preferred control strategy and/or one or more of the other candidate control strategies. For example, the evaluation information may comprise one or more of: a required metrology effort to implement the control strategy, an expected performance of the semiconductor manufacturing process performed according to the control strategy (for example an expected yield should the control strategy be adopted); and an expected stability of the semiconductor process according to the control strategy.

The interface may further enable addition of one or more further candidate control strategies, for evaluation and/or enable modification. Also any of the candidate control strategies being evaluated may be modified (e.g., enable modification of the process settings and/or required metrology settings relating to one or more of the plurality of candidate control strategies) using the flow design interface disclosed herein. Process settings which may be modified in this manner may comprise, for example, one or more of: a model utilized in data processing, a sampling scheme layout, a metrology type, a characteristic of a control interface.

The user interface may be configured to communicate a graph of expected performance of the semiconductor manufacturing process versus a metrology characteristic needed to achieve the expected performance for at least the preferred control strategy, and possibly for one or more of the other candidate control strategies. The metrology characteristic may be one or more of: metrology effort (e.g., measurement density—i.e., the number of measurement locations per lot/per number of substrates/per substrate/per field/per die or per region—and/or measurement frequency), metrology sampling scheme, metrology type, metrology measurement time.

Figure 5:
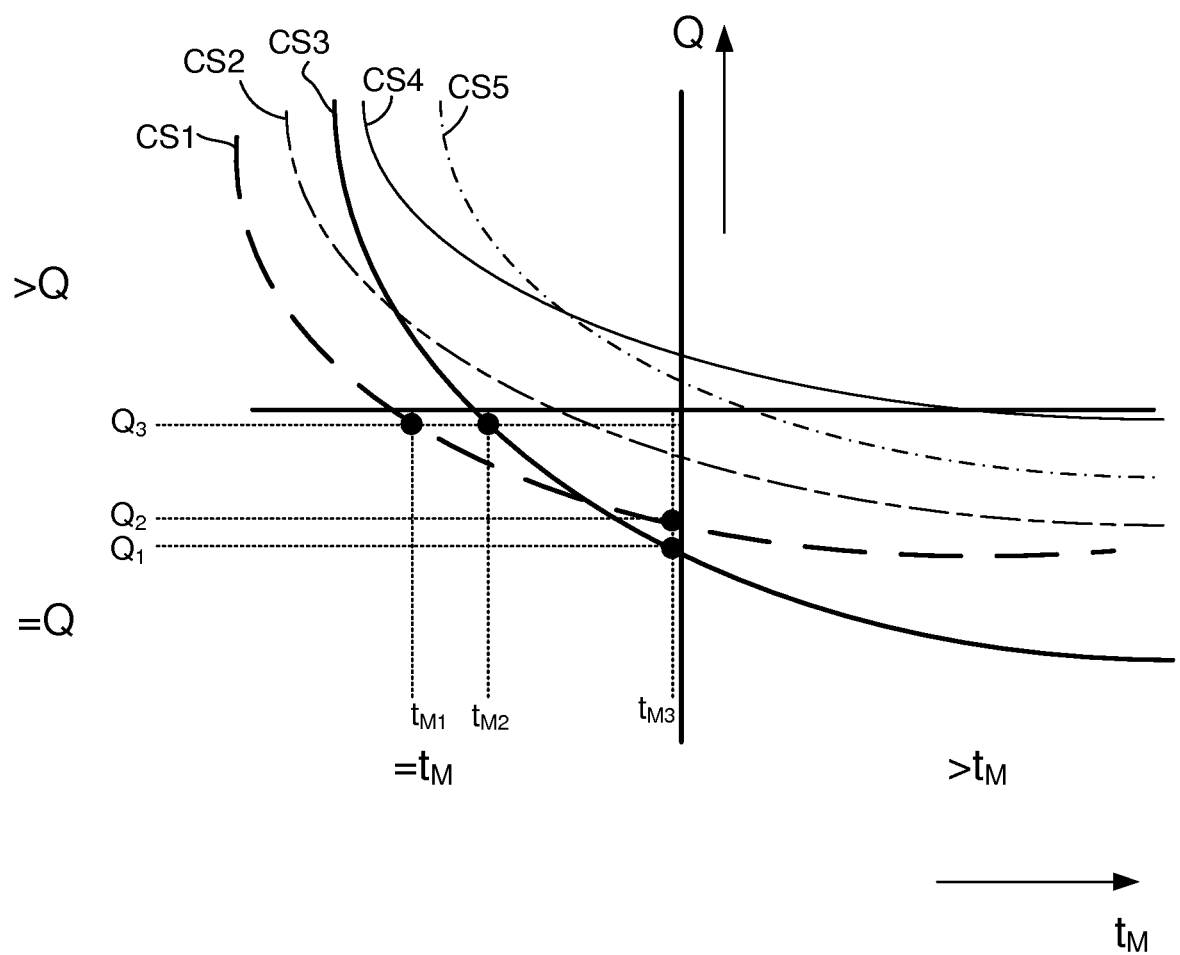
FIG. 5 illustrates a graph which may be an output of a method according to an embodiment, comprising a quality metric Q on the y-axis (where higher values indicate lower quality) and metrology time $T_M$.

FIG. 5 illustrates such a graph which may be an output of a method according to an embodiment. The graph shows a quality metric Q on the y-axis (where higher values indicate lower quality) and metrology time TM (or other metrology effort metric) on the x-axis. The graph is divided into four quadrants. The bottom-left quadrant is the quadrant of interest where both the quality metric and metrology time specifications are met (i.e., quality and metrology are acceptable). The top-left quadrant relates to a solution space for which the metrology time specification is met, but the quality metric specification is exceeded (i.e., the quality is insufficient). The bottom-right quadrant relates to a solution space for which the quality metric specification is met, but the metrology time specification is exceeded. The top-right quadrant relates to a solution space for which neither quality nor metrology time metrics are met. The graph shows five curves CS1-CS5, each relating to a corresponding control strategy, e.g., candidate control strategies being evaluated. One or more of the curves may also relate to a strategy of reference.

It can be seen that curves CS1, CS2 and CS3 relate to candidate control strategies which meet both quality and metrology time specifications for at least a portion of the curve. Curves CS4 and CS5 do not pass through the bottom-left quadrant and therefore can be discounted for further consideration or evaluation (at least without amendment to the corresponding strategy). As already mentioned, decision on a preferred control strategy may take into account whether quality of metrology time is prioritized, provided minimum standards for both are met. An example of this may be deciding between the control strategies represented by curves CS1, CS2 and CS3. Should a high quality be prioritized, then the control strategies represented by CS3 may be preferred as these enables the highest quality metric Q1 to be achieved for an acceptable, although relatively long, associated metrology time tM3 Curve CS1 may be ranked next followed by curve CS2. However, should metrology time be prioritized then the control strategy represented by curve CS1 may be preferred as this enables the minimum metrology time tM1 for an acceptable quality Q3. Curve CS3 may be ranked next followed by curve CS2.

The preferred control strategy may be associated with a required presence of commercial options (e.g., presence of particular software and associated licensing cost/presence of particular hardware). Such an embodiment may comprise selecting one or more commercial options available (e.g., via the user interface). The preferred control strategy may then be determined based on the available commercial options.

The user interface may also enable selection of a subset of the candidate control strategies based on an evaluation thereof, e.g., based on one or more of: required metrology effort, required commercial products offering implementation of one or more control strategies.

The user interface further may also enable filtering or expansion of the process data; e.g., to filter the process data associated with a degree of relevance to the performance of the semiconductor manufacturing process.

The method may comprise a step of determining a control recipe associated with the preferred control strategy. The control recipe may comprise control settings for any aspect of said semiconductor manufacturing process. As such, the control recipe may comprise settings for one or more of: lithographic apparatus (scanner) correction (e.g., stage positioning for overlay and/or focus, dose control, lens heating mitigation etc.), reticle correction, correction of an etch process, correction for a track system, correction for a (e.g. transient) model associated with one or more apparatus utilized in performing the semiconductor manufacturing process.

Figure 6:
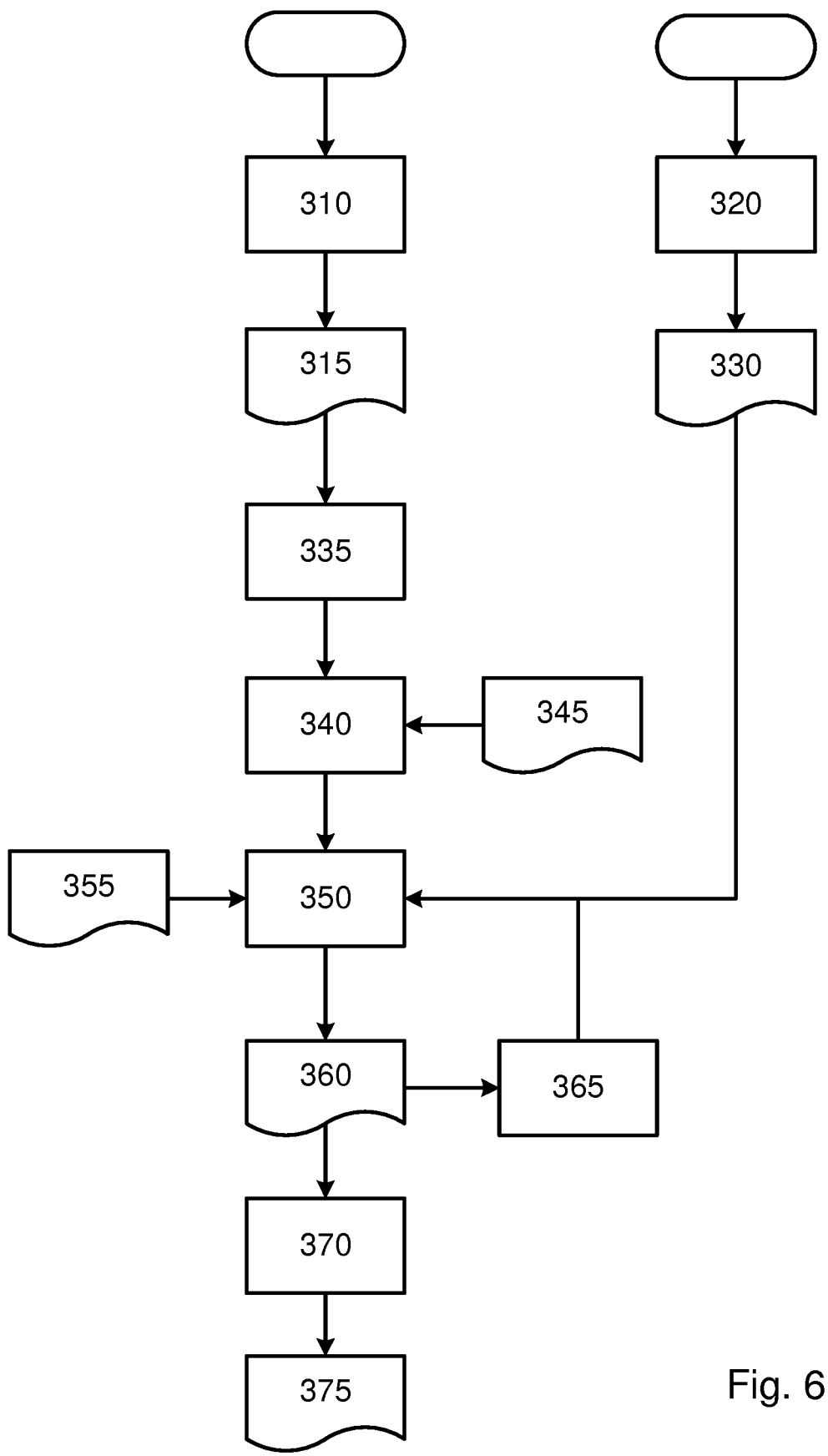
FIG. 6 is a flowchart describing an evaluation method according to an embodiment of the invention.

FIG. 6 is a flowchart describing a method for evaluating candidate process strategies according to an embodiment. At step 310, a user starts setup advice for a particular process (e.g., relating to a formation of a layer). This may comprise inputting setup data 315 relevant to the semiconductor manufacturing process, such as layout data (e.g., reticle or design data) etc. At step 320, a user sets quality limits and metrology budget(s) for that process (layer). This may comprise process specification metric data 330 such as process window data, best setting data etc. At step 335, (optionally) a priority is set to prioritize either quality or metrology. This enables the system to provide a single preferred solution, where multiple solutions are available. At step 340, based on the setup data and the process specification metric data, the system proposes a number of candidate control strategies (e.g., scanner and metrology data sets) for setup and qualification. Alternatively or in addition to the system proposing candidate control strategies, candidate control strategies 345 can be input by the user. At step 350, the system evaluates each optimized control strategy, by (for example) calculating a predicted quality metric against metrology time/effort for each control strategy (e.g., using the quality metric prediction data). Optionally, the evaluation takes into account other cost introducing solutions 355, such as: additional license cost (commercial options), additional tooling cost (e.g. after etch metrology) and/or additional setup/lead time cost (e.g. additional setup metrology data needed). Based on the evaluation 350, an output 360 is produced. The output 360 may comprise a preferred control strategy which best meets a quality metric (e.g., yield or overlay for example) for an acceptable metrology effort (and optionally taking into account any quality vs. metrology preference and/or other cost introducing solutions 355). The output 360 may comprise a representation of quality against metrology effort for the preferred control strategy and/or one, some or all of the other candidate control strategies. The output may be configured only to show a select subset of the evaluated control strategies, such as only those which meet a minimum quality threshold and/or metrology effort (or, more generally, cost) threshold, or only a set number of best performing strategies (in terms of quality and/or cost), for example. At step 365, one or more parameters, for example relating to one or more of the candidate control strategies, may be modified or amended, or other candidate control strategies added and the evaluation step 350 repeated. At step 370 a user selects a desired control strategy (e.g., the control strategy identified as preferred or another) and the system generates appropriate control recipes 375 for the selected control strategy.

Further embodiments of the invention are disclosed in the list of numbered clauses below:

1. A user interface for designing, configuring and/or editing a control flow representing a control strategy associated with a semiconductor manufacturing process, the user interface comprising: a library of control elements, each control element being selectable by a user; a control flow editor configured to organize said control elements into a control flow representing the control strategy; and a communication interface for communicating the control flow to a calculation engine configured to evaluate the control flow.
2. A user interface according to clause 1 wherein the library of control elements comprise control elements representing one or more of the following types of tasks: simulation, optimization, sampling, visualization and estimation.
3. A user interface according to clause 1 or 2, further comprising a library of data elements representing one or more data sources and/or data stores.
4. A user interface according to clause 3, wherein one or more of the data elements are individually configurable.
5. A user interface according to any preceding clause, wherein one or more of the control elements are individually configurable.
6. A user interface according to clause 5, wherein the control elements can be configured by selecting a particular action and/or module for the control element.
7. A user interface according to any preceding clause, wherein the control flow editor is further configured to enable editing of one or more provided pre-defined control flows.
8. A control strategy evaluation tool comprising: a user interface according to any preceding clause; and said calculation engine configured to evaluate the control flow received via the communication interface.
9. A control strategy evaluation tool according to clause 8, wherein the calculation engine is configured to simulate the control strategy described by the control flow; and evaluate the control strategy based on the simulation.
10. A control strategy evaluation tool according to clause 8 or 9, wherein the control strategy evaluation tool further comprises an advisor module configured to provide advice on said control flow.
11. A control strategy evaluation tool according to clause 10, wherein the advice comprises advice for optimizing the semiconductor manufacturing process.
12. A control strategy evaluation tool according to clause 10 or 11, wherein the advice comprises one or more of: advice on which control elements and/or settings thereof might optimize a control flow, advice on which control flow might optimize the semiconductor manufacturing process, recommendation against, or even prevention of selection of an inappropriate control element, setting or flow, and advice on the data available for control setup and/or simulation.
13. A control strategy evaluation tool according to any of clauses 8 to 12, wherein the control strategy evaluation tool comprises an artificial data generator for generating artificial data for use by the calculation engine in the evaluation step.
14. A control strategy evaluation tool according to clause 13, wherein the artificial data generator is operable to extrapolate, interpolate or otherwise obtain artificial data from measured data for which the effect of a one or more variations on a control strategy, and/or another characteristic of the semiconductor manufacturing process, used to obtain said measured data is estimated.
15. A control strategy evaluation tool according to clause 13 or 14, wherein the artificial data comprises data that has been anonymized from inputted user data.
16. A non-transient computer program carrier comprising a computer program implementing the user interface of any of clauses 1 to 7.
17. A non-transient computer program carrier comprising the computer program implementing the control strategy evaluation tool of any of clauses 8 to 15.
18. A user interface for designing, configuring and/or editing a control flow representing a control strategy associated with a semiconductor manufacturing process, the user interface comprising: a library of control elements comprising at least a control element representing a task of simulation and each control element being selectable by a user; a control flow editor configured to organize said control elements into a control flow representing the control strategy; and a communication interface for communicating the control flow to a calculation engine configured to evaluate the control flow.
19. A user interface as claimed in claim 1 wherein the library of control elements further comprises control elements representing one or more of the following types of tasks: optimization, sampling, visualization and estimation.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A control strategy evaluation hardware tool comprising: one or more processors,
software, when executed by the one or more processors, configured to generate a user interface on a hardware display, the user interface for designing, configuring and/or editing a control flow representing a control strategy associated with a semiconductor manufacturing process, the user interface comprising:
a library of control elements comprising at least a control element representing a task of simulation to be performed during execution of the control strategy to physically control the semiconductor manufacturing process and each control element being selectable by a user, and
a control flow editor configured to organize the control elements into a control flow representing the control strategy; and
software configured to implement a calculation engine configured to:
simulate the control strategy described by the control flow, and
evaluate the control strategy based on the simulation.

2. The control strategy evaluation hardware tool as claimed in claim 1, wherein the library of control elements further comprises one or more control elements representing one or more selected from: an optimization task, a sampling task, a visualization task and/or an estimation task.

3. The control strategy evaluation hardware tool as claimed in claim 1, further comprising a library of data elements representing one or more data sources and/or data stores.

4. The control strategy evaluation hardware tool as claimed in claim 3, wherein one or more data elements of the data elements are individually configurable.

5. The control strategy evaluation hardware tool as claimed in claim 1, wherein one or more control elements of the control elements are individually configurable.

6. The control strategy evaluation hardware tool as claimed in claim 5, wherein the one or more control elements are configurable by selecting a particular action and/or module for the one or more control elements.

7. The control strategy evaluation hardware tool as claimed in claim 1, wherein the control flow editor is further configured to enable editing of one or more provided pre-defined control flows.

8. The control strategy evaluation hardware tool as claimed in claim 1, further comprising software, when executed by the one or more processors, configured to implement an advisor module configured to provide advice on the control flow, wherein the advice comprises advice for optimizing the semiconductor manufacturing process.

9. The control strategy evaluation hardware tool as claimed in claim 8, wherein the advice comprises one or more selected from: advice on which control elements and/or settings thereof might optimize a control flow, advice on which control flow might optimize the semiconductor manufacturing process, recommendation against, or even prevention of selection of, an inappropriate control element, setting or flow, and/or advice on the data available for control setup and/or simulation.

10. The control strategy evaluation hardware tool as claimed in claim 1, further comprising software, when executed by the one or more processors, configured to implement an artificial data generator configured to generate artificial data for use by the calculation engine in the evaluation of the control strategy.

11. The control strategy evaluation hardware tool as claimed in claim 10, wherein the artificial data generator is configured to extrapolate, interpolate or otherwise obtain artificial data from measured data for which the effect of one or more variations on a control strategy, and/or another characteristic of the semiconductor manufacturing process, used to obtain the measured data is estimated.

12. A non-transitory computer program carrier comprising a computer program stored therein, the computer program, upon execution by a computer system, configured to cause the computer system to at least:
generate a user interface on a hardware display, the user interface for designing, configuring and/or editing a control flow representing a control strategy associated with a semiconductor manufacturing process, the user interface comprising:
a library of control elements comprising at least a control element representing a task of simulation to be performed during execution of the control strategy to physically control the semiconductor manufacturing process and each control element being selectable by a user, and
a control flow editor configured to organize the control elements into a control flow representing the control strategy; and
implement a calculation engine configured to:
simulate the control strategy described by the control flow, and
evaluate the control strategy based on the simulation.

13. The non-transitory program carrier as claimed in claim 12, wherein the library of control elements further comprises one or more control elements representing one or more selected from: an optimization task, a sampling task, a visualization task and/or an estimation task.

14. The non-transitory program carrier as claimed in claim 12, wherein the user interface further comprises a library of data elements representing one or more data sources and/or data stores.

15. The non-transitory program carrier as claimed in claim 12, wherein the one or more control elements are configurable by selecting a particular action and/or module for the one or more control elements.

16. The non-transitory program carrier as claimed in claim 12, wherein the control flow editor is further configured to enable editing of one or more provided pre-defined control flows.

17. The non-transitory program carrier as claimed in claim 12, wherein the instructions are further configured to cause the computer system to implement an advisor module configured to provide advice on the control flow, wherein the advice comprises advice for optimizing the semiconductor manufacturing process.

18. The non-transitory program carrier as claimed in claim 17, wherein the advice comprises one or more selected from: advice on which control elements and/or settings thereof might optimize a control flow, advice on which control flow might optimize the semiconductor manufacturing process, recommendation against, or even prevention of selection of, an inappropriate control element, setting or flow, and/or advice on the data available for control setup and/or simulation.

19. The non-transitory program carrier as claimed in claim 12, wherein the instructions are further configured to cause the computer system to implement an artificial data generator configured to generate artificial data for use by the calculation engine in the evaluation of the control strategy.

20. The non-transitory program carrier as claimed in claim 19, wherein the artificial data generator is configured to extrapolate, interpolate or otherwise obtain artificial data from measured data for which the effect of one or more variations on a control strategy, and/or another characteristic of the semiconductor manufacturing process, used to obtain the measured data is estimated.

* * * * *